US011890982B2

(12) United States Patent
Schmid

(10) Patent No.: US 11,890,982 B2
(45) Date of Patent: Feb. 6, 2024

(54) LOAD-LIFTING DEVICE

(71) Applicant: Felix Schmid, Kreuzlingen (CH)

(72) Inventor: Felix Schmid, Kreuzlingen (CH)

( * ) Notice: Subject to any disclaimer, the term of this patent is extended or adjusted under 35 U.S.C. 154(b) by 0 days.

(21) Appl. No.: 17/774,260

(22) PCT Filed: Nov. 3, 2020

(86) PCT No.: PCT/EP2020/080770
§ 371 (c)(1),
(2) Date: May 4, 2022

(87) PCT Pub. No.: WO2021/089518
PCT Pub. Date: May 14, 2021

(65) Prior Publication Data
US 2022/0388438 A1 Dec. 8, 2022

(30) Foreign Application Priority Data

Nov. 6, 2019 (EP) .................................. 19207341

(51) Int. Cl.
*B60P 1/44* (2006.01)
(52) U.S. Cl.
CPC ........... *B60P 1/4471* (2013.01); *B60P 1/4414* (2013.01); *B60P 1/4407* (2013.01); *B60P 1/4492* (2013.01)
(58) Field of Classification Search
CPC ..... B60P 1/4407; B60P 1/4414; B60P 1/4471; B60P 1/4492
See application file for complete search history.

(56) References Cited

U.S. PATENT DOCUMENTS

| | | | | |
|---|---|---|---|---|
| 1,341,904 A | * | 6/1920 | Hubbard | B60P 1/4407 414/438 |
| 3,226,086 A | * | 12/1965 | Lavieri | B60P 1/4414 254/124 |
| 9,095,482 B2 | * | 8/2015 | Gressett | B60P 1/4414 |
| 10,272,816 B1 | * | 4/2019 | Watkins | B60P 3/07 |

FOREIGN PATENT DOCUMENTS

| | | |
|---|---|---|
| DE | 202004004127 U1 | 6/2004 |
| EP | 0359600 A1 | 3/1990 |
| FR | 2245499 A1 | 4/1975 |
| FR | 2438008 A1 | 4/1980 |

OTHER PUBLICATIONS

Jan. 11, 2021 International Search Report issued in International Patent Application No. PCT/EP2020/080770.

* cited by examiner

*Primary Examiner* — James Keenan
(74) *Attorney, Agent, or Firm* — Oliff PLC

(57) ABSTRACT

A load-lifting device for mounting on a vehicle, including a platform for receiving a load which can be brought from a lowered into a raised working position, and back again, as well as a linking lever, a support element, a drive element and a connection element. The linking lever that is pivotally mounted on the platform is linked to the vehicle at a linking end region. The support element attached to the platform includes a foot end which braces the ground. The drive element brings the support element from a resting state associated with the resting position of the platform, into a working state in which the foot end is braced on the ground and the platform is raised into the working position. The connection element functions to control the rotational position of the linking lever and the pivot position of the platform according to the support element.

13 Claims, 4 Drawing Sheets

LOAD-LIFTING DEVICE

BACKGROUND

The invention relates to a load-lifting device for mounting on a vehicle, and a vehicle having a corresponding load-lifting device.

Load-lifting devices for loading and unloading a vehicle are known in various embodiments which are adapted to the type of load and the size of the load-bearing vehicle. For example, load-lifting devices for trucks require a high load-bearing capacity and must accordingly be configured in a correspondingly large and stable manner. This in turn involves a higher inherent weight and increased spatial requirement of the load-lifting device. Load-lifting devices for vans differ from those for trucks mostly only as a result of a smaller load-bearing capacity and smaller dimensions and a resultant lower inherent weight. On the whole, however, the construction of load-lifting devices for both vehicle types is generally the same to the greatest possible extent. Regardless of the vehicle type or the size of the load-lifting device, the current load-lifting devices are constructed in such a manner that, after the load has been lifted, they no longer have any contact with the substrate. This results in the weight of the lifted load having to be carried completely by the vehicle. Depending on the weight and the positioning of the load on the load-lifting device, this may constitute a significant load for the vehicle or the suspension or the connection between the load-lifting device and the vehicle. This disadvantage is particularly evident in vans which normally have only one rear axle.

SUMMARY

An object of the present invention is therefore to provide a load-lifting device for a vehicle in which the forces acting on the vehicle and/or the suspension of the load-lifting device can be reduced. Furthermore, the load-lifting device should enable simple assembly on various vehicle types.

This object is achieved according to the invention with a load-lifting device according to claim 1. Preferred embodiments of the invention are set out in the dependent claims.

The invention relates to a load-lifting device for mounting on a linking end region of a vehicle. According to the invention, the load-lifting device comprises a platform, a linking lever, a support element, a drive element and a connection element.

The platform serves to receive a load and generally has a longitudinal axis which extends from a first end facing a linking end region of the vehicle to a second end opposite and spaced apart from the first end. Accordingly, the platform generally comprises a transverse axis which extends in the plane of the platform at right-angles with respect to the longitudinal axis. The platform generally further has a preferably planar surface which extends in the longitudinal and transverse direction.

According to the invention the linking lever is pivotably supported on the platform and articulated to the linking end region of the vehicle. The articulation of the linking lever to the platform is carried out at least at one link location and the pivot axis generally extends in the transverse direction of the platform through the link location. The linking lever generally comprises a first end region which is articulated to the vehicle and at least one other second end region which is spaced apart from the first end region.

The support element is connected to the platform in an articulated or rigid manner and comprises a base end which is provided for support on a substrate. Preferably, the connection of the support element to the platform is carried out by means of a connection end opposite the base end.

In the case of an articulated connection of the support element to the platform, the platform consequently preferably comprises at least two link locations; the first link location for articulation of the linking lever (which is also present in the case of a rigid connection of the support element to the platform) and a second link location for articulation of the support element. In this instance, the first link location is preferably located in the region of the first end of the platform and the second link location is preferably spaced apart from the first link location when viewed in the longitudinal direction and in the direction of the second end of the platform.

According to the invention, the connection element is connected, on the one hand, to the linking lever and, on the other hand, to the support element and serves to control the rotation position of the linking lever and the pivot position of the platform in accordance with the support element. The term "rotation position of the linking lever" consequently describes the positioning of the linking lever in relation to the vehicle and to the platform.

In this instance, the position of the second end of the platform in relation to the first end of the platform when the platform has been moved about a pivot axis is defined as the pivot position. In this instance, the pivot axis extends substantially parallel with the transverse direction and through the first link location of the platform.

According to the invention, the platform can be moved from a lowered rest position into a raised working position and back again. The lifting of the platform from the rest position into the working position is carried out using the drive element.

Specifically, according to the invention the drive element is intended to move the support element from a rest position which is associated with the rest position of the platform into a working position in which the base end is supported on the substrate and the platform is lifted into the working position. The rest position is defined in this regard as the position in which the platform has the smallest possible spacing with respect to the substrate and is preferably even positioned on the substrate in order to facilitate the loading of a load.

In the rest position of the platform, the support element is in a rest position. In the rest position, the support element may be in contact with the substrate, as set out in detail below, but embodiments are also conceivable where the support element in the rest position has no contact with the substrate, for example, by being retracted in the manner of a telescope and/or accommodated in a recess of the platform.

In the working position, the platform is at least in regions spaced apart from the substrate, wherein the spacing of the platform from the substrate in the working position is in any case larger than in the rest position.

Preferably, in the working position, at least the portion of the platform which carries the load is arranged substantially parallel with the longitudinal axis of a vehicle and at the height of a lower edge of a loading opening of the vehicle.

In the working position of the platform, the support element is located in the working position. This position is defined in that the base end of the support element is in contact with the substrate and is spaced further apart from the platform than in the rest position.

A pivoting of the platform both out of the rest position and out of the working position is preferably possible.

The load-lifting device according to the invention has with respect to the prior art the advantage that at least a portion of the load acting on the vehicle and/or the suspension (as a result of the inherent weight of the load-lifting device and a load carried thereby) can be transmitted via the support element to the substrate or supported thereon. As a result of the support of the support element on the substrate, the risk of the vehicle being overloaded at the rear side can be substantially minimized.

Preferably, the linking lever is a linear lever arm, an angle lever or a rocker.

The linking lever is preferably adapted to the vehicle geometry. There is defined as the vehicle geometry the orientation, position and dimensions of the vehicle and in particular components which are secured to the vehicle, such as a rear tailgate, bumper bar, mudguard, rear trim, trailer coupling suspension and/or trailer coupling frame. As a result of the adaptation of the shape of the linking lever to the vehicle geometry, it is possible to position the platform in the working position close to the vehicle so that a seamless transition from the platform to the vehicle—in particular the loading face thereof—can be substantially produced. The lever arm may, for example, be configured in such a manner that in the working position of the platform it provides a bridge between the platform in the working position and loading face of the vehicle so that a load which is supported on rollers can be rolled from the platform via the linking lever onto the loading face of the vehicle. Furthermore, as a result of the adaptation of the shape of the linking lever to the vehicle geometry, a pivoting of the platform about a pivot axis which extends in a transverse direction is enabled so that the platform can be pivoted into a transport position which is preferably orientated at least substantially at right-angles with respect to the working position. The preferred pivotability of the platform into the transport position will be discussed in detail below and in connection with FIG. 3.

In a preferred embodiment of the load-lifting device, the linking lever is in the form of a torsion frame. The torsion frame is in this instance preferably formed by means of a plurality of linking levers which extend parallel with each other and which are connected to each other. When the linking lever is constructed as a torsion frame, the stability of the device in the transverse direction of the platform is increased so that a tilting of the platform (about a tilting axis which extends in a longitudinal direction) can also be prevented with loading at one side. Furthermore, the use of a torsion frame has the advantage that a single support element is sufficient or the tilting stability of the platform does not have to be ensured via two or more support elements.

Alternatively, however, the linking lever may also be constructed in the form of only one lever arm which is constructed in a torsion-resistant manner.

In another preferred embodiment of the load-lifting device, the support element is connected to the platform in an articulated and particularly preferably pivotable manner. An articulated connection between the support element and the platform enables in particular the support element to pivot from a rest position which is orientated substantially parallel with the platform into the working position. In the rest position, the support element consequently preferably abuts the platform or is accommodated inside the platform and enables the platform to be positioned close to the substrate in the rest position thereof. Furthermore, an articulated connection between the support element and platform enables the support element to also remain in contact with the substrate whilst the platform is being raised or lowered and thus to be able to carry out the support function thereof even when the platform is changed from the rest position into the working position and back again.

Preferably, the connection element intersects a straight line between a first link location of the platform to the linking lever and a second link location of the platform to the support element. This preferred arrangement of the connection element with respect to the link locations of the platform to the linking lever or to the support element can be seen in FIG. 2*a*.

Preferably, the connection element is in this instance constructed as a rigid connection without a link or as a connection with a multiple link. A connection with a multiple link may, for example, be produced in the form of a 3-link or multi-link chain.

With regard to a uniform force transmission, the connection element is in a particularly preferred manner constructed to be stable in terms of pressure and/or tension. Regardless of this, the connection element is preferably constructed to be adjustable in terms of length. Specific examples of preferred connection elements are, for instance, a hydraulic cylinder; a turnbuckle or a clamping screw; or a gear mechanism, in particular a spindle gear.

As described above, the connection element is connected at corresponding connection or link locations, on the one hand, to the linking lever and, on the other hand, to the support element. By changing the position of the connection locations and/or the length of the connection element, the movement of the platform or the position thereof can be controlled. If the platform is located, for example, in a rest position which declines from the vehicle and in which it forms an angle with a (horizontal) substrate, the end of the platform furthest away from the vehicle is preferably readily raised first so that the platform is orientated in a substantially horizontal manner and subsequently raised further as a whole substantially parallel with the horizontal orientation until it reaches its working position. In order to facilitate loading of loads into the vehicle, the platform can also be readily overturned so that the end of the platform further away from the vehicle is located slightly higher than the end of the platform closer to the vehicle.

In another preferred embodiment of the load-lifting device, the base end of the support element is in the form of a roller. Alternatively, the base end of the support element may also have a sliding face which slides over the substrate or a stable base which is configured specially for it, for example, a wooden board. The use of a roller or a sliding face enables the load-lifting device to be used regardless of the nature and orientation of the substrate. In particular, in combination with an articulated connection of the support element and the platform, the support element when changing between the rest position and the working position thereof can roll or slide over the substrate with the base end thereof.

Preferably, the load-lifting device comprises only one support element. The use of only one support element enables an easy construction of the load-lifting device. This in turn enables the load-lifting device to be allowed to be permanently secured to the vehicle without the fuel consumption of the vehicle increasing excessively in this instance or the useful load of the vehicle available for loading being significantly decreased. Furthermore, a light construction type of the load-lifting device enables it also to be able to be folded up or disassembled manually. After the disassembly, it is possible to place the load-lifting device in situ or to transport it in the vehicle.

In another preferred embodiment of the load-lifting device, the drive element is in the form of a hydraulic cylinder, pneumatic cylinder or a gear mechanism, in particular a spindle gear. The selection of the drive element is preferably carried out in accordance with the vehicle type. For example, the use of a pneumatic or hydraulic cylinder is particularly advantageous when the load-lifting device can be connected to an already existing pneumatic or hydraulic circuit. When the drive element is constructed as a gear mechanism, it is preferably coupled to an electric motor which is supplied by means of an available power circuit. If no corresponding circuit is present on the vehicle, the load-lifting device or the drive element can also be readily connected to an external pneumatic, hydraulic or electrical supply (installed separately in the vehicle).

Preferably, the drive element drives the support element and/or the linking lever. The term "drive" also includes in this instance indirect driving of the support element or the linking lever.

In an exemplary embodiment, the connection element with regard to indirect driving of the linking lever is constructed to be rigid and stable in terms of tension and pressure. If the position of the support element is now changed using the drive element (that is to say, the support element is actively driven by the drive element), the direct position change of the support element also brings about an indirect change of the rotation position of the linking lever and/or the pivot position of the platform.

Since the main load is generally located on the support element, a driving of the support element is particularly preferred. Depending on the type of drive element, for example, type of gear mechanism, or with a very low construction type of the load-lifting device (for instance, with a suspension on the vehicle close to the ground), however, a driving of the linking lever may also be advantageous.

If the connection element is constructed to be adjustable in terms of length, there may be provided an additional drive element which changes the length of the connection element. Since the connection element is connected according to the invention both to the linking lever and to the support element and the linking lever and the support element are both in turn connected to the platform, by changing the length of the connection element the orientation of the linking lever and the support element and consequently also the pivot position of the platform can be changed, for example, finely adjusted.

In another preferred embodiment of the load-lifting device, the linking end region on the vehicle is constructed as a trailer coupling frame. An assembly of the load-lifting device on the trailer coupling or other vehicle structures which already exist is particularly advantageous from the point of view of costs since the provision of special securing devices can thus be dispensed with. The assembly on a trailer coupling frame further enables, as a result of the standardized dimensions and loading provisions for trailer couplings, particularly simple securing of the load-lifting device to extremely varied vehicle classes and vehicle types.

Nonetheless, the load-lifting device may also be secured to the vehicle in a different manner as long as the load-bearing structure permits a corresponding use.

As mentioned above, the connection between the vehicle and load-lifting device can preferably be released in a simple manner. The load-lifting device can thus also be transported in the vehicle or disassembled when not in use. To this end, the attachment to the vehicle is preferably constructed as a hinge, in particular as a slip joint flag hinge, a plug-in hinge or piano type hinge which enable a rapid assembly and disassembly.

Preferably, the load-lifting device is constructed in such a manner that the platform can be moved into a transport position which is located at least substantially vertically with respect to the working position. In a particularly preferred manner, the platform in this instance is pivoted about a pivot axis which extends in a transverse direction so that the platform in the transport position is arranged at least substantially at right-angles with respect to the plane of the vehicle chassis. In this position, the platform can be fixed to the vehicle in a space-saving manner, which facilitates the transport thereof and reduces the fuel consumption of the vehicle. Preferably, the platform can be fixed to the vehicle in the transport position in the region of the second end of the platform by means of a fixing device. The securing to the vehicle may, for example, be carried out by means of a cable or a clamping strap. Alternatively, there may be provided on the platform a lug which can be secured to a hook on the vehicle. Furthermore, the platform or the vehicle may have a protruding locking projection which in the transport position of the platform can engage and be releasably locked in a receiving element which is provided on the vehicle or on the platform. In order to counteract damage to the vehicle, corresponding damping elements may be fitted at potential abutment locations.

In order to move the platform from the working position into the transport position, corresponding drive means, for example, a tension or pressure device, may be provided. Alternatively, the platform may also be pivoted manually into the transport position and, after the fixing means has been released, moved back into the working position using gravitational force.

In another preferred embodiment, at least the frame elements and/or load-bearing components of the load-lifting device are produced from a material which is selected from the group comprising metal, in particular steel, aluminum or stainless chromium steel; wood; composite carbon materials; composite glass fiber materials, plastics materials and admixtures. With regard to a high level of damage tolerance and simple repair possibilities, at least the load-bearing components of the load-lifting device are preferably produced from metal or a metal alloy.

The use of light metals, composite carbon materials, composite glass fiber materials and plastics materials enables a particularly lightweight construction of the load-lifting device and is particularly advantageous with regard to the assembly on a lighter vehicle. From a point of view involving cost and a lower risk of splintering in the event of damage, light metals are preferred.

With regard to the structural composition of the platform, it preferably comprises a recess for receiving the support element. The recess enables the support element to be recessed partially or completely in the platform so that in the rest position of the platform the lower side of the load-lifting device can be positioned as flat as possible on a planar substrate. This facilitates the loading and unloading of the platform, for instance with loads on rollers. Furthermore, a compact construction of the platform is enabled. With regard to the most space-saving configuration possible, it is further preferable for the platform to comprise a plurality of components which can be readily disassembled/assembled or can be arranged in a space-saving manner one on the other, for example, in a state connected to each other by means of hinges. The size of the platform can thus be adapted depending on requirements. In a particularly preferred manner, by means of disassembly or folding of individual edge elements of the platform, the extent of the load-lifting device in the transport position in the transverse direction and in the longitudinal direction can be reduced.

In another preferred embodiment of the load-lifting device, it is constructed in such a manner that it can move a useful load of at least 80 kg, preferably 200 kg. In this embodiment, an advantage of the load-lifting device in particular involves it being able to lift a load which exceeds the maximum loading of a van. As a result of the construction of the load-lifting device according to the invention, a load which is located on the platform is increasingly, preferably predominantly, carried by the load-lifting device itself and transmitted to the vehicle only to the smallest possible extent.

Preferably, the load-lifting device has in this instance an inherent weight of from 20 to 200 kg, preferably from 25 to 150 kg and in a particularly preferred manner from 30 to 80 kg. The low inherent weight enables the load-lifting device to be able to be readily disassembled and where applicable carried by one or two persons.

Preferably, the linking lever, the platform, the support element and the connection element are connected to each other in such a manner that the platform is displaced from the rest position into the working position at least substantially parallel with a longitudinal vehicle axis. The platform preferably moves in this instance parallel with the plane of the vehicle chassis. This enables loads which are supported on rollers or wheels to also be lifted without them starting to move excessively and to roll off the platform when the platform is raised/lowered.

Preferably, the support element always forms an acute angle with the longitudinal axis of the platform when the platform is raised from the rest position into the working position, wherein the angle increases when the platform is raised. This requires an articulated connection between the support element and platform. As described above, the platform in this embodiment comprises in a particularly preferred manner a lower-side recess in which the support element can be received or pivoted in the rest position thereof.

The invention also relates to a vehicle having a load-lifting device described above.

The invention is explained in greater detail below with reference to a number of embodiments which are illustrated in the Figures. When alternative embodiments differ only in terms of individual features, the same reference numerals have been used for the features which remain the same. In the schematic drawings:

DETAILED DESCRIPTION

Figure 1A:
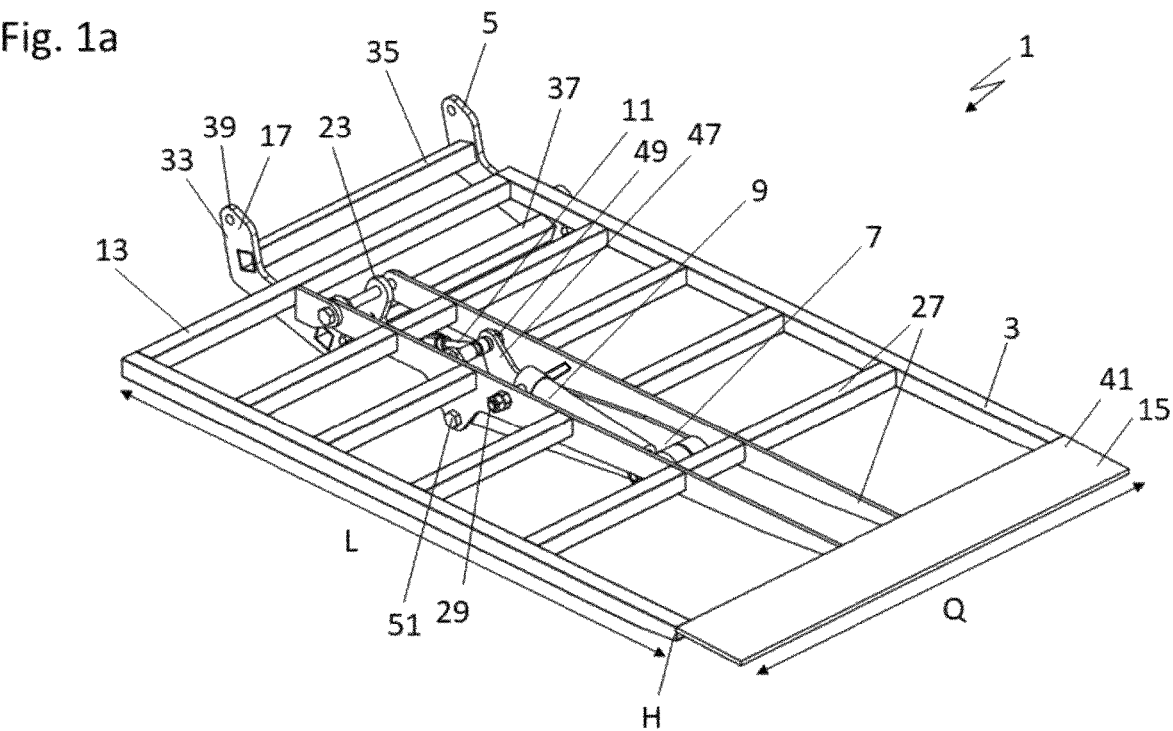
FIG. 1a is a perspective plan view of a load-lifting device according to the invention in a rest position.

The load-lifting device 1 according to the invention illustrated in FIGS. 1a to 1d comprises a platform 3, a linking lever 5, a support element 7, a drive element 9 and a connection element 11. The platform 3 comprises a closed surface which for better understanding is not illustrated in FIGS. 1a to 1c. The platform 3 comprises a first end 13 and a second end 15 which is spaced apart from the first end 13 and a longitudinal axis L and a transverse axis Q which extends at right-angles relative thereto. The linking lever 5 comprises a first end region 17 which is articulated to a linking end region 19 of a vehicle 21 (see FIG. 3). The linking lever 5 comprises a second end region 23 and a third end region 25 (see FIG. 2a) which are both spaced apart from the first end region 17. Via the second end region 23, the linking lever 5 is connected to the platform 3 in an articulated manner and via the third linking region 25 the linking lever 5 is connected to the connection element 11 in an articulated manner. For better load distribution, the platform 3 comprises struts 27 in the longitudinal and transverse direction L, Q of the platform 3. The drive element 9 is connected by means of connection means 29, 31, on the one hand, to the platform 3 and, on the other hand, to the support element 7. The connection means 29, 31 may, for example, be constructed as continuous bolts which preferably engage through the drive element 9 and the platform or the support element at the corresponding articulation or connection locations.

In the embodiment illustrated, the linking lever 5 is constructed as a torsion frame 33 with one or more transverse strut(s) 35, 37. However, it is also conceivable for the linking lever 5 to comprise only one lever arm 39 and in this instance for the first linking region 17 to be constructed to be stable in terms of torsion. Furthermore, the linking lever is in the embodiment shown, when viewed in the transverse direction Q, not secured centrally to the platform 3. This is associated with the type of the vehicle to which the platform is secured and can be freely changed. It is particularly conceivable for the linking lever 5 to be constructed to be substantially narrower than the platform 3 in the transverse direction Q and to be fitted either centrally, laterally or in any intermediate position. It is also conceivable for the linking lever 5 to have the same width in the transverse direction Q as the platform 3.

The platform 3 further comprises a ramp 41 in order to bridge a profile height H of the platform 3. The support element 7 comprises a base end 43 which is facing away from the platform and which has a roller 45 and a connection end 47 opposite the base end. The connection end 47 comprises two link locations 49, 51 at which the connection element 11 and the platform 3 are connected to the support element 7.

Figure 1B:
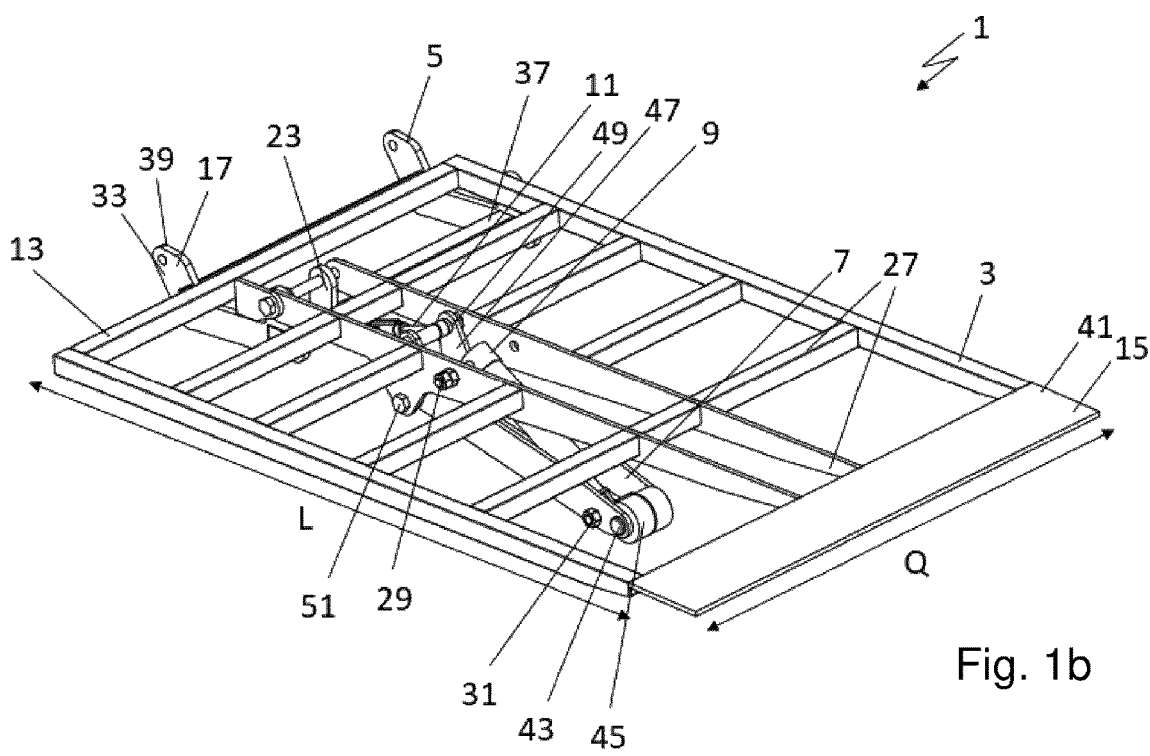
FIG. 1b is a perspective plan view of the load-lifting device from FIG. 1a in the transition between the rest position and a working position.
Figure 1C:
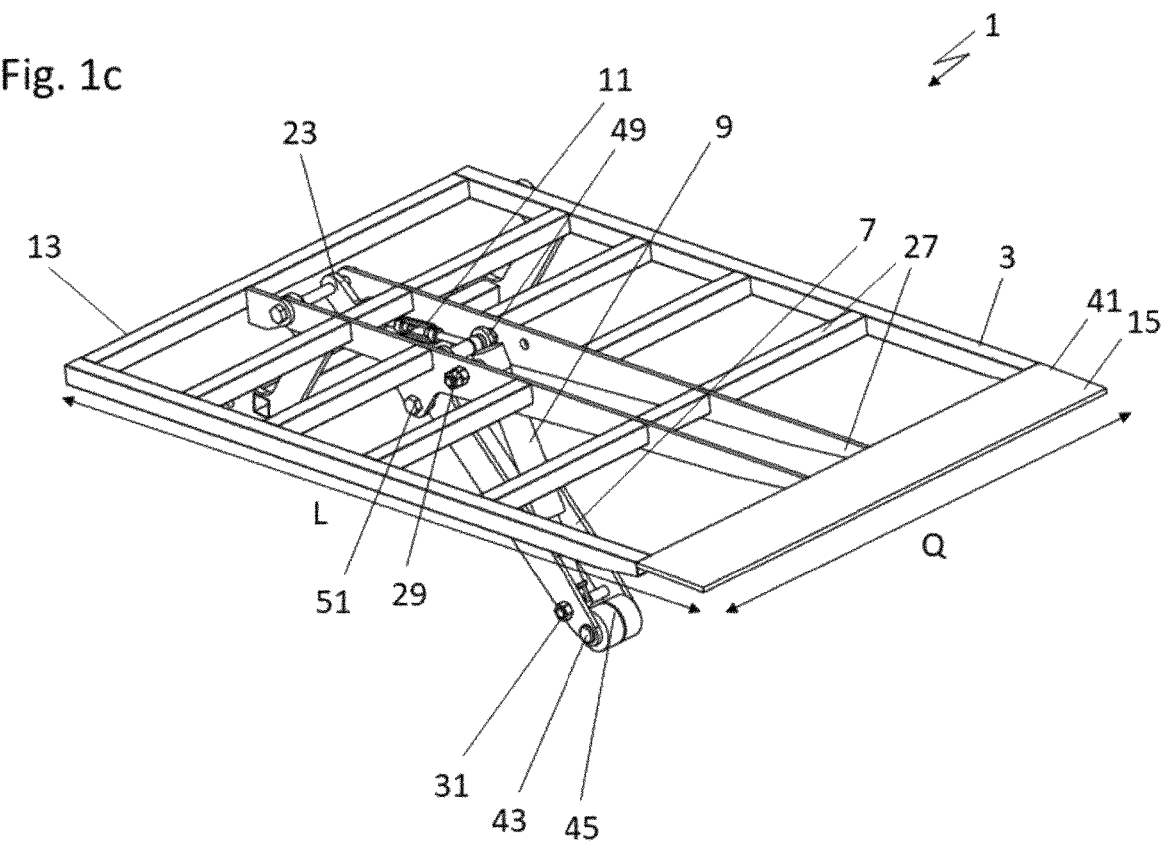
FIG. 1c is a perspective plan view of the load-lifting device from FIG. 1b in the working position.
Figure 1D:
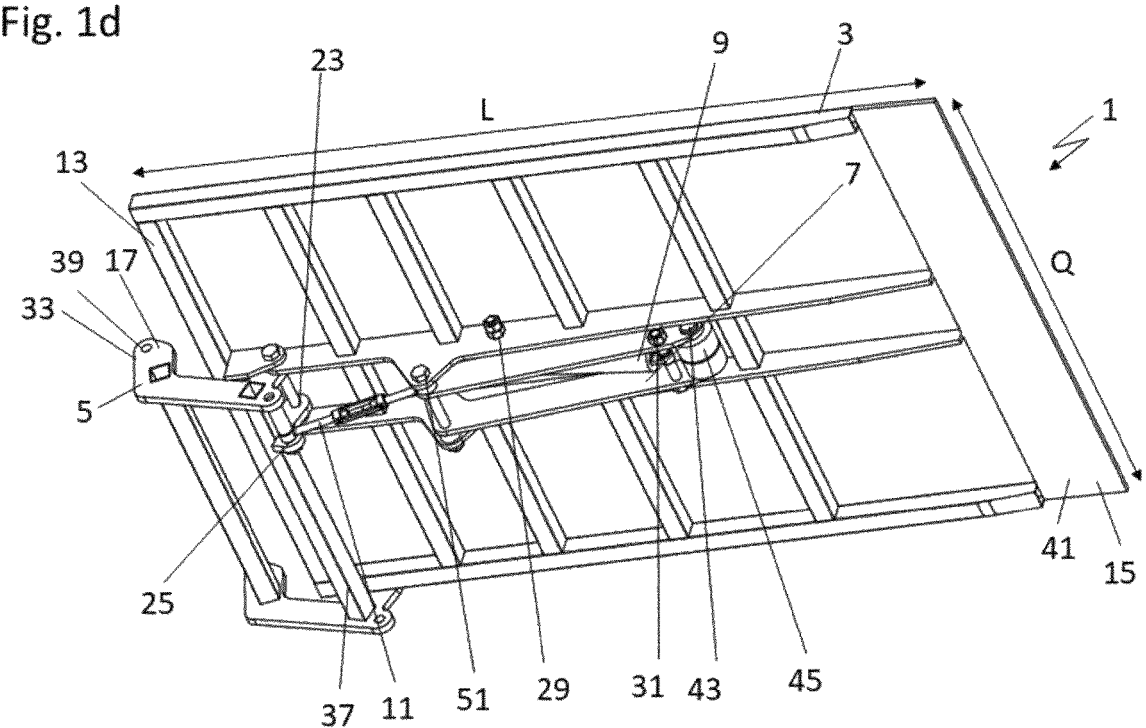
FIG. 1d is a perspective bottom view of the load-lifting device from FIG. 1a in the rest position.
Figure 2A:
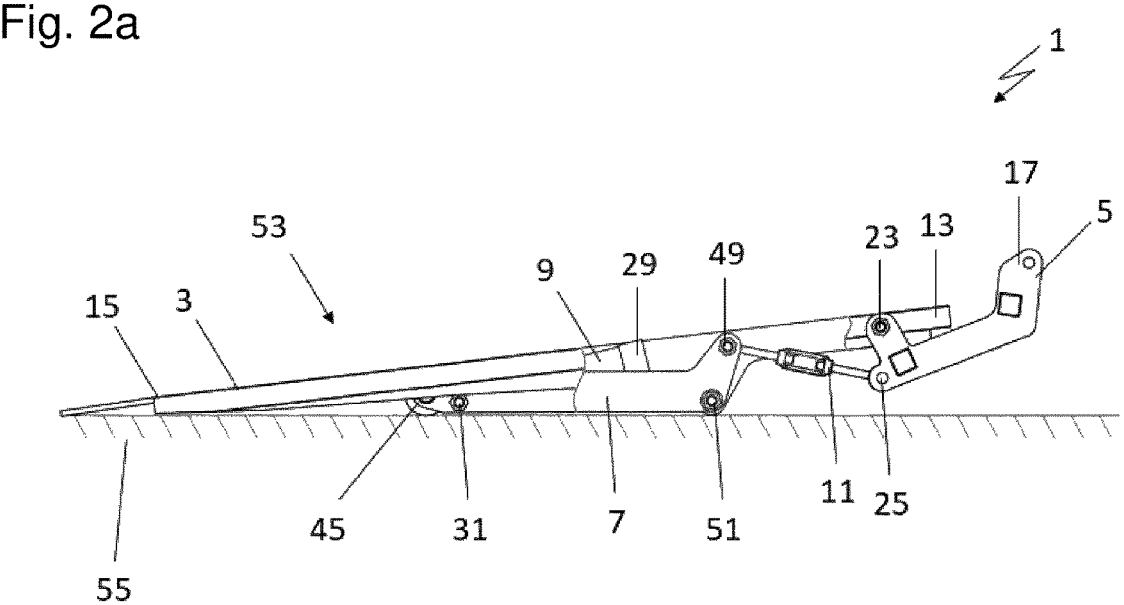
FIG. 2a is a side view of the load-lifting device from FIG. 1a in the rest position.
Figure 2B:
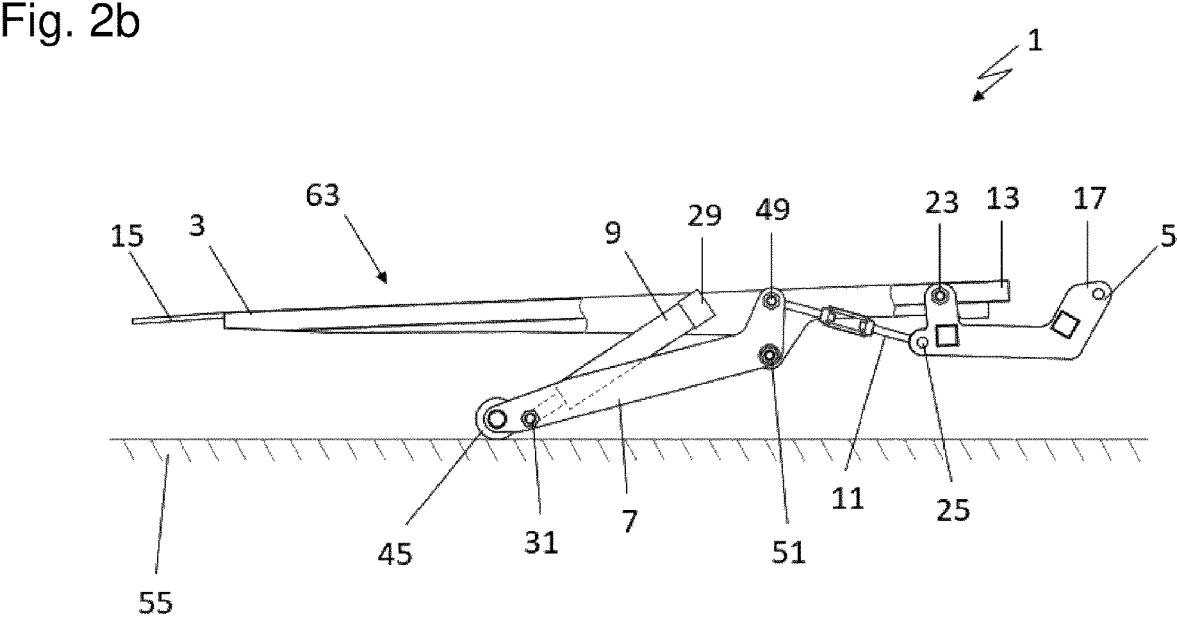
FIG. 2b is a side view of the load-lifting device from FIG. 1b in the transition between the rest position and the working position.
Figure 2C:
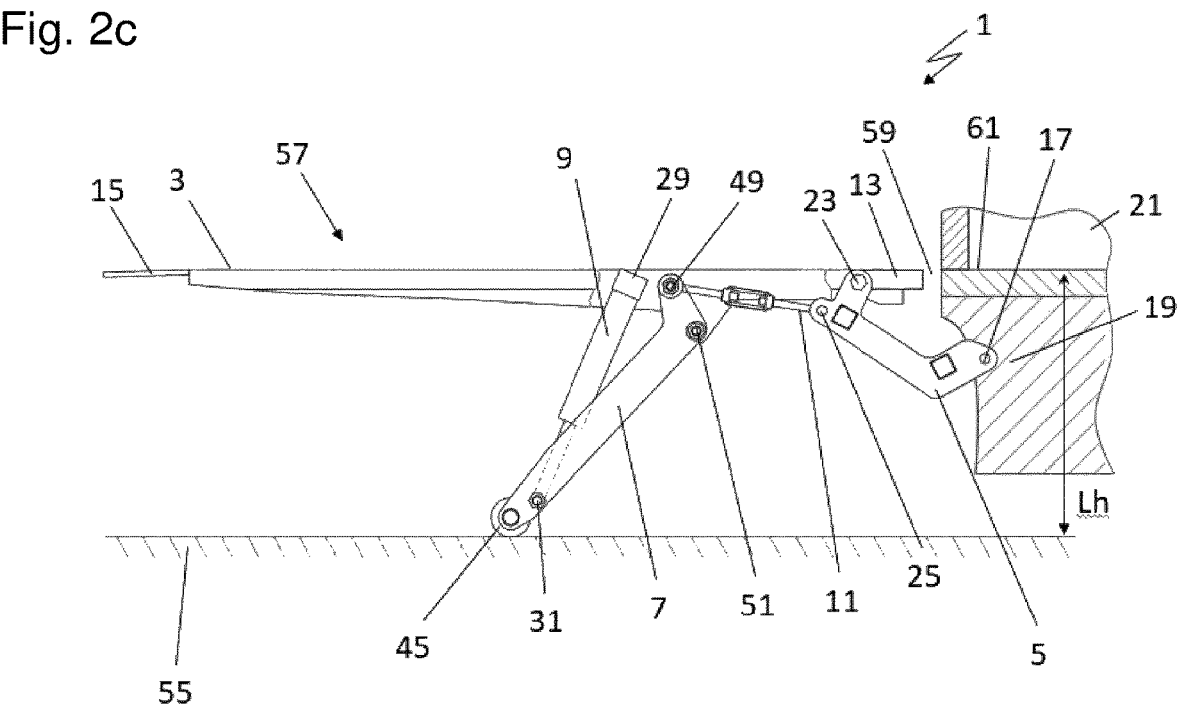
FIG. 2c is a side view of the load-lifting device from FIG. 1c in the working position.

FIGS. 2a to 2c show the load-lifting device 1 according to the invention in a rest position 53, wherein for greater clarity of the connection of the linking lever 5, platform 3, support element 7 and connection element 11, the struts 27 shown in FIGS. 1a-1c and the platform 3 are partially not illustrated. In the rest position 53, the second end 15 of the platform 3 in the embodiment shown is in contact with a substrate 55 so that a load (not illustrated) can be rolled, carried or pushed onto the platform 3. Even if this is the case in the variant shown, the support element 7 and in particular the roller 45 at the base end 43 of the support element 7 in the rest position 53 of the platform 3 do not necessarily have to be in contact with the substrate 55. From the rest position 53, the platform 3 is raised by the drive element 9 increasing the spacing between the link locations 29, 31 on the platform 3 and the support element 7 until the platform reaches the working position 57 (FIG. 2c). In the working position 57, the platform 3 is at the same height as a loading edge height Lh of the vehicle 21. A possible spacing 59 between a loading edge 61 of the vehicle 21 in the working position is where possible avoided or kept so small that it does not impede the transport of the load or where applicable can be bridged by means of an extendable (or alternatively unfoldable or attachable) element (not illustrated).

As a result of the arrangement of the link locations 49, 51 and the end regions 23, 25, the second end 15 of the platform 3 is lifted more quickly from the rest position than the first end 13 so that the platform moves as quickly as possible into a substantially horizontal position 63 (see FIG. 2b). From this substantially horizontal position 63, the platform 3 is subsequently displaced in a substantially parallel manner or raised into the working position 57 (see FIG. 2c).

Figure 3:
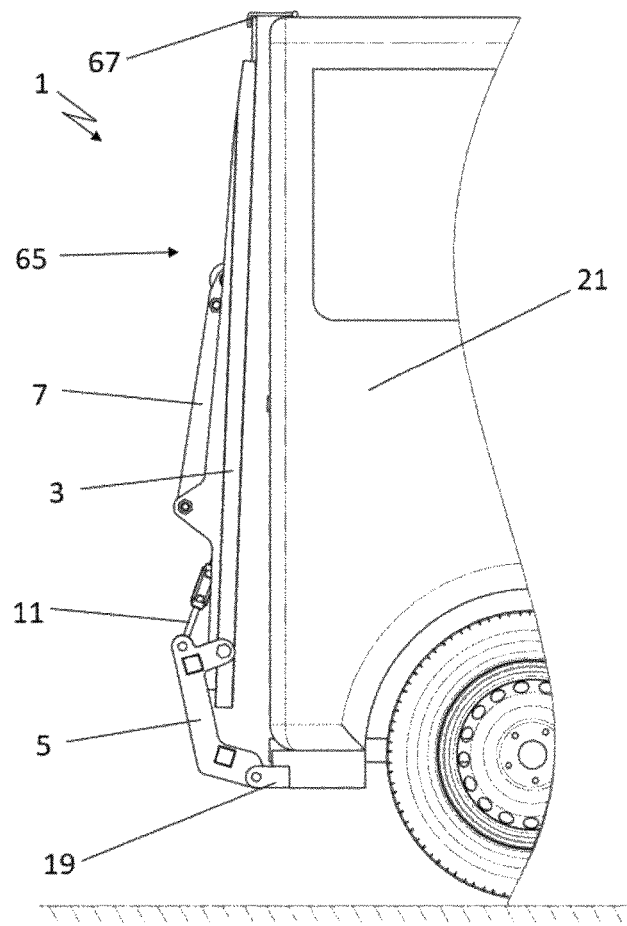
FIG. 3 is a side view of the load-lifting device from FIG. 1a in a transport position.

For the transport, the load-lifting device 1 according to the invention can be pivoted from the working position 57 into a transport position 65. The transport position 65 is shown in FIG. 3. In the transport position 65, the load-lifting device 1 is secured to the vehicle 21 by means of the linking end region 19 and fixed by means of a fixing device 67.

The invention claimed is:

1. A load-lifting device for mounting on a vehicle, comprising:
    a platform which can be moved from a lowered rest position into a raised working position and back again in order to receive a load,
    a linking lever which is pivotably supported on the platform and which is configured to be articulated to the vehicle via a linking end region,
    a support element which is connected to the platform and which has a base end which is provided for support on a substrate,
    a drive element which is configured to move the support element from a rest position which is associated with the rest position of the platform into a working position in which the base end is supported on the substrate and the platform is raised into the working position, and
    a connection element which is connected, on one side thereof, to the linking lever and, on another side thereof, to the support element in order to control a rotation position of the linking lever and a pivot angle of the platform in accordance with the support element.

2. The load-lifting device as claimed in claim 1, wherein the linking lever is in the form of a torsion frame.

3. The load-lifting device as claimed in claim 1, wherein the support element is connected to the platform in an articulated manner.

4. The load-lifting device as claimed in claim 1, wherein the connection element intersects a straight line between a first link location of the platform to the linking lever and a second link location of the platform to the support element.

5. The load-lifting device as claimed in claim 1, wherein the connection element is adjustable in terms of length.

6. The load-lifting device as claimed in claim 1, wherein the base end of the support element is in the form of a roller.

7. The load-lifting device as claimed in claim 1, wherein the load-lifting device comprises only one support element.

8. The load-lifting device as claimed in claim 1, wherein the drive element is in the form of a hydraulic cylinder, pneumatic cylinder or a gear mechanism.

9. The load-lifting device as claimed in claim 1, wherein the drive element drives the support element and/or the linking lever.

10. The load-lifting device as claimed in claim 1, wherein the platform can be moved into a transport position which is located at least substantially vertically with respect to the working position.

11. The load-lifting device as claimed in claim 1, wherein the load-lifting device comprises a material which is selected from a group comprising metal; wood; composite carbon materials, composite glass fiber materials; plastics materials and admixtures thereof.

12. The load-lifting device as claimed in claim 1, wherein the platform has a recess for receiving the support element in the rest position thereof.

13. A vehicle having a load-lifting device as claimed in claim 1.

* * * * *